July 24, 1962 L. A. KNOX 3,046,541
ANGLE DIGITIZER
Filed June 29, 1959 6 Sheets-Sheet 1

FIG. 1

INVENTOR.
LEWIS A. KNOX

BY SUGHRUE, ROTHWELL, MION & ZINN
ATTORNEYS

July 24, 1962    L. A. KNOX    3,046,541
ANGLE DIGITIZER

Filed June 29, 1959    6 Sheets-Sheet 4

July 24, 1962  L. A. KNOX  3,046,541
ANGLE DIGITIZER
Filed June 29, 1959  6 Sheets-Sheet 5

United States Patent Office 3,046,541
Patented July 24, 1962

3,046,541
ANGLE DIGITIZER
Lewis A. Knox, Owego, N.Y., assignor to International Business Machines Corporation, New York, N.Y., a corporation of New York
Filed June 29, 1959, Ser. No. 823,382
16 Claims. (Cl. 340—347)

This invention relates to improvements in digitizers for providing a digital representation of the angular position of an input shaft. More particularly, this invention relates to a digitizer having a vernier read-out disc positioned by a servo driven optical micrometer, thus providing a compact apparatus for accurately resolving very small angular arcs into digital representations.

Shaft digitizers for providing a digital manifestation of an angular position provide the fulfillment of the precise measuring requirements in a number of diverse fields. For example, in the art of inspecting, precise measurements of angular index positions, hole locations and the like may be taken by a shaft digitizer or angular analogue-to-digital converter, which can be tied to an automatic data processing machine. Similarly, in the field of automatic machining, such devices can be quite useful. For automatic testing and test equipment, shaft digitizers can also be useful and can again be tied directly to a digital computer or data processing machine.

One particular field requiring precise angular measurements by means of a small compact angle digitizer is the guidance and navigation for air and space vehicles. For example, in a space vehicle, accurate fix taking requires very accurate angular measurements and one second of arc increments are desirable. For space navigation, these increments represent approximately 150 feet of error in 4000 nautical miles. To provide a shaft digitizer providing a digital representation for approximately every second or arc increment in 360° requires a digitizer capable of dividing a circle into $1.296 \times 10^6$ bits, and 360° divided into $(2)^{20}$ bits equals approximately 1¼ seconds of arc per bit. In an inertial guiding system, gyroscope stabilized platforms are needed, which will provide a digital output signal for direct connection to a high speed digital computer or data processing machine. It is advantageous to indicated gyroscope gimbal angular positions within a few seconds of arc referred to the platform case, which may be attached to a vehicle. Anlogue-to-digital conversion equipment separate from such platform would limit the performance of the system. The present electromechanical shaft digitizers available are nearly as large as the gyroscope gimbals and since eccentricity errors are a fundamental limitation of their performance, the requirement is for an improved digitized angular read-out technique.

The known type of shaft angle digitizers capable of digitizing extremely small increments of a circle are of two general types. One type in which an input shaft directly drives a digitizer disc is presently available. In this type of apparatus, the disc must be relatively large in diameter to provide a small increment. For example, a $(2)^{20}$ bit division in the known direct driven digitizers would require a direct driven disc 64 inches in diameter, and the eccentricity would have to be limited to fifteen millionths of an inch to limit the error to a maximum of one second of arm. Thus, the direct driven disc-type digitizers would be impractical for requirements of small size and weight to provide for one second of arc resolution. Another known digitizer available is the type wherein a speed-up gear is provided between an input shaft and a small digitizer. The speed-up gears are again quite large and bulky, and gears presently available are not accurate enough to provide the requisite bit resolution. Also, the slew speed is reduced because of the gear speed-up unit, thus limiting the speed of fix taking in navigation.

It is an object of this invention to overcome the deficiencies of the prior art by providing a small direct driven angle digitizer using an optical micrometer for positioning a vernier digitizer disc in accordance with the position of a direct driven input digitizer disc.

It is another object of this invention to provide a shaft digitizer using a servo driven optical micrometer in which a direct driven digitizer carries means to indicate a sense of direction and in which sharply defined nulls are produced by the system to provide extreme accuracy in nulling the servo means of the optical micrometer to position a vernier digitizer.

It is an additional object of this invention to eliminate eccentricity errors which are inherent in rotary members by averaging diametrically opposite readings of a direct driven digitizer disc.

Further objects of this invention are to provide a shaft digitizer with an optical micrometer, which allows working at a null point and spreading out the scale of the digitizer on a vernier disc, and to provide continuous rotation of a vernier digitizer disc by continuous rotation of a micrometer with optical discontinuities.

Other objects of the invention will be pointed out in the following description and claims and illustrated in the accompanying drawings which disclose, by way of example, the principles of the invention and the best mode which has been contemplated of applying these principles.

In general, this invention contemplates providing a small input disc, which is directly driven by an input member or the like, and this input disc contains conventional read-out means by brushes or the like to a resolution limited by the size of the input disc to provide a rough digital representation of the angular position of the input member. The input disc has optical track means thereon for effectively providing a code of the next higher order than that provided by the conventional readout means. Two optical tracks are provided and each has small angular offsets; thus bit-to-bit transitions are sharply defined nulls by comparison of the projected images of the optical code tracks, and the direction of rotation may be indicated. By projecting an image of the optical tracks from one side of the input code disc through the diametrically opposite side which averages the diametrically opposite readings, any inherent eccentricity errors of the input disc are cancelled. The projected optical image of the tracks on one side of the input disc is deviated by means of an optical micrometer to produce a saw-tooth image deviation during continuous rotation of a micrometer support. The deviation of the image is utilized to produce an optical null. The optical micrometer is driven by a servo, and the servo is actuated in accordance with the unbalance of the optical transmission from the tracks on the input disc. Thus, when the input disc is between the bits of the highest order resolution; i.e., the optical track; the light transmission is unbalanced between the two tracks. By sensing the amount and sense of light transmission unbalance and driving the servo accordingly, the optical micrometer nulls the light transmission by deviating the image of the optical tracks. The drive from the servo to the micrometer includes a vernier disc containing a large number of bits thereon, and this vernier disc is also provided with conventional readout means, such as brushes, magnetic heads, or the like. For example, by providing the input disc with a readout for $(2)^{10}$ bits and the vernier with a readout for $(2)^{10}$ bits and with its disc positioned according to the intermediate bit position of the optical $(2)^{11}$ track on the input disc, the input angular position may be digitized to $(2)^{20}$ bits or 1¼ seconds or arc per bit.

Figure 1:
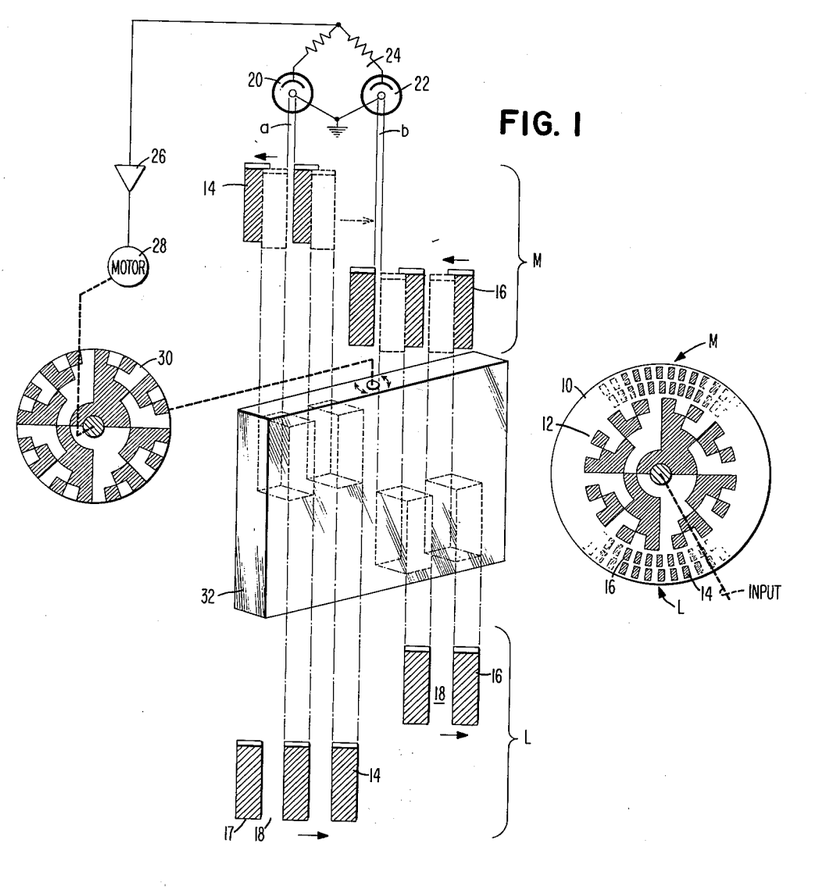
FIG. 1 is a schematic illustration of an angle digitizer with a servo drive optical micrometer utilizing the principles of this invention.

Referring to the drawings, FIG. 1 illustrates the principles of the invention in schematic form. An input member 10, shown schematically as a disc, which is adapted to be angularly positioned by means of an input device, contains a conventional reflected binary code 12 for brush readout to provide an indication of the position of the input shaft to a degree of resolution limited by the size of the input member. The next higher order binary number on the input member 10 is effectively provided by two concentric optical tracks 14 and 16. Each optical track contains spaced opaque and transparent areas 17 and 18, respectively. By a projection system to be described in detail hereinafter, the opaque areas 17 of tracks 14 and 16 on one side of the drum are projected to be substantially superimposed upon the tracks 14 and 16 on the opposite side of disc member 10. In FIG. 1, the opaque areas at L are projected on the diametrically opposite opaque areas of tracks 14 and 16 at M.

The position of the opaque areas 17 of each track 14 and 16 are shifted a small amount in equal and opposite directions when positioned on the disc member 10. In a predetermined bit boundary position, this optical track offset allows a small amount of light to be transmitted by two light beams "a" and "b" through the optical tracks 14 and 16 and these beams are of equal intensities. With beams "a" and "b" of equal intensity and low intensity, the optical system is balanced or nulled. If the disc 10 is rotating counterclockwise, as indicated by the arrows on tracks 14 and 16, the light intensity of transmitted beam "a" will diminish, and the intensity of transmitted beam "b" will increase as can be seen in FIG. 1. Thus, any off null position will increase the transmission through one track and decrease the transmission through the other track. Furthermore, the direction of this displacement from a null position, either clockwise or counterclockwise, is indicated by the direction of unbalance of the intensity of transmitted light beams "a" and "b."

The intensities of transmitted light beams "a" and "b" are sensed by suitable photocells 20 and 22 or other photosensing devices which are positioned in two legs of a bridge circuit 24. The output of the bridge is connected to a saturating transistor amplifier 26 for driving a servo motor 28. The servo motor 28 is mechanically coupled to a vernier disc 30 and an optical refracting means 32 for deviating an image. The vernier disc 30 may have a reflected binary code pattern thereon for conventional brush readout. The optical refracting means 32 functions as an optical micrometer and has been illustrated schematically in FIG. 1 as a parallel plane refracting plate mounted for rotation to simplify the explanation of the invention.

Figure 2:
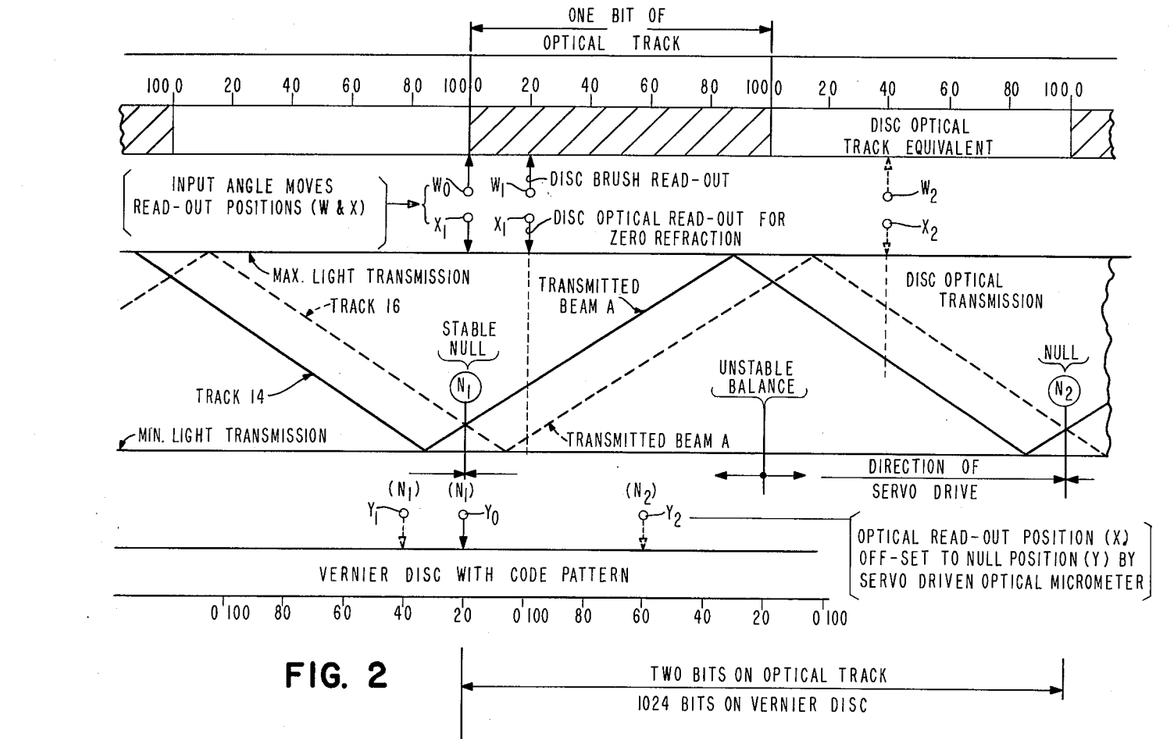
FIG. 2 is a graphical representation of the position of an input disc, vernier disc and the light transmission between bits on the optical track of the input disc to further illustrate the principles of this invention.

The basic principles of this invention may be understood with reference to FIG. 2 in conjunction with FIG. 1. FIG. 2 illustrates the optical track and several positions of brushes for reading out the input disc 10 by conventional means. The optical transmission of the light beams "a" and "b" is indicated schematically varying from minimum light transmission to maximum light transmission. The light transmitted through each track is shown, and where there is low intensity and equal or balanced light transmission there is a stable null. For example, when an input disc readout brush is at $W_0$ and disc optical readout at the bit boundary or position of no refraction $X_0$, the transmitted beams "a" and "b" are balanced and the servo driven refracting plate and vernier disc remains at zero position as represented by readout brush $Y_0$. For an input angle represented by brush position W1, the disc optical readout will be at position X1. With the disc brush readout 20 percent into the next bit position, the disc optical readout X1 will be to the right of the stable null position N1. This will cause an unbalance of the light transmitted to photocells 20 and 22 by beams "a" and "b," and due to the fact that the intensity of transmitted beam "a" is greater than the intensity of transmitted beam "b," the unbalance in bridge 24 will cause the amplifier 26 to supply a signal to servo motor 28 and rotate the optical micrometer 32 to deviate the projected image of the optical tracks to obtain the null position N1. While the servo motor 28 is driving the optical micrometer 32, it is also positioning the vernier disc 30. It may be seen that by rotating the optical micrometer 32 to the null position N1, the vernier disc 30, with its code pattern of an expanded scale thereon, is rotated a corresponding amount and the readout may be obtained from its expanded scale by brush Y1, as shown in FIG. 2.

A position of unstable balance is at the position of light high intensity, and at this position the direction of servo drive reverses. For example, reading out at 40 percent past the bit boundary at brush position W2, the optical readout is positioned at X2. This will cause an unbalance in the intensity of the transmitted light beams, and transmitted beam "b" will be greater than transmitted beam "a," causing the servo motor to rotate the optical micrometer 32 to null N2, and thereby rotate vernier disc 30 in an opposite direction from that described previously, causing the vernier disc to move relative to readout brush $Y_0$ from null position to the position shown in FIG. 2 by Y2. It may be seen that a stable null for low light transmission is reached during each two bits of optical tracks on disc 10. The two bits of optical track on the disc 10 may represent a large number of bits on the vernier disc and, for example, this may be 2 to the 10th power $(2)^{10}$ or 1024 bits.

By projecting the image of the optical tracks 14 and 16 on one side L of the input disc and superimposing these images on the optical tracks 14 and 16 of the other side M of the disc, small eccentricities will be compensated. In other words, small eccentricities of the disc will not change the alignment of the clear and opaque areas 18 and 17 and therefore will not introduce angular errors into the system. This principle of eliminating angular errors of small eccentricity by averaging readings from diametrically opposite portions of a rotatably mounted scale contributes to the accuracy of the angle digitizer.

Figure 3:
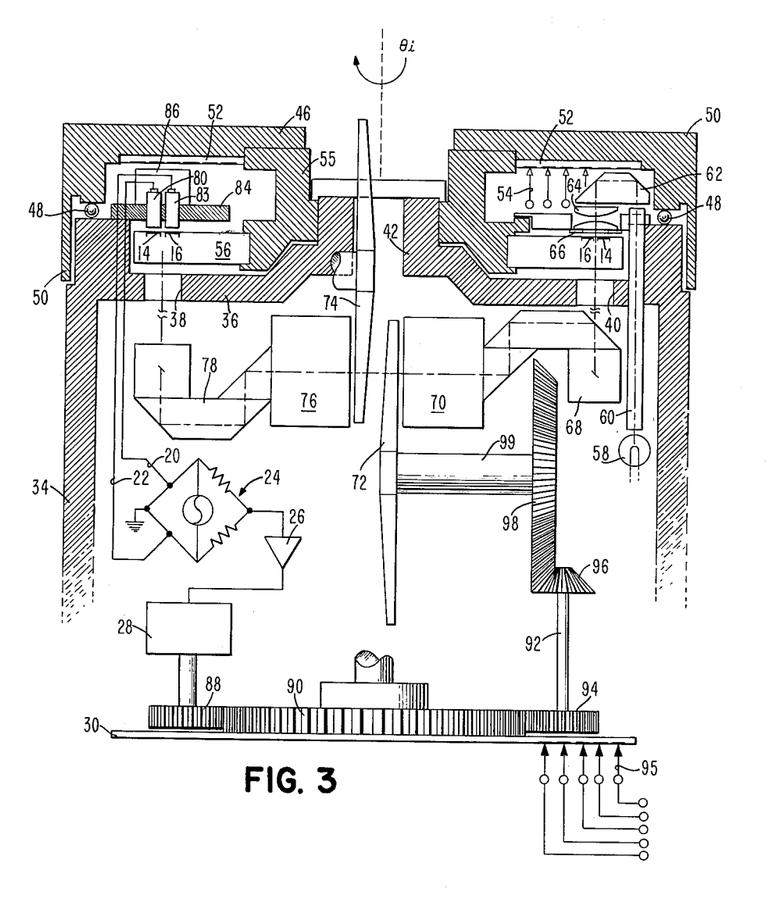
FIG. 3 is a sectional elevation view, partially schematic, illustrating a compact arrangement of the components of this invention.

A structure utilizing the basic principles of this invention and adapted to provide extremely fine resolution in digitizing angular inputs is shown in FIG. 3. The digitizer shown in FIG. 3 includes a housing 34 which may also function as a base portion and which is generally cylindrical in shape. The housing 34 contains an end flange 36 and this end flange has diametrically opposite light passages or holes 38 and 40 therein. A collar portion 42 of end flange 36 serves as a centering guide. A rotatably mounted platform or table 46 is adapted to provide the angular input to be digitized. A gyroscope, telescope or other input means (not shown) may be attached to table 46 and the apparatus will digitize the angular position of table 46 and the input means.

Table 46 is mounted for rotation on housing 34 by means of anti-friction balls 48 which are precision ground to extremely narrow tolerances. The effective race diameter of the ball-bearing provided by balls 48, base 34 and input table 46 is relatively large to minimize input angle tilt and the introduction of errors about mutually perpendicular axes. An overhanging flange 50 on table 46 may provide a sealing function.

Secured directly to table 46 is a disc member 52 having a code pattern thereon. This pattern may be a conventional reflected binary or Gray code of alternate conducting and insulating sectors for conventional brush readout. Stabilization or centering of table 46 is obtained by the cooperation of member 55 and collar 42 providing a bushing arrangement. The optical tracks 14 and 16 discussed previously are mounted on a transparent disc 56 secured to member 55 for rotation with the table 46. Thus, input angle $\theta_1$ of table 46 may be directly read out in reflected binary code by means of brushes 54 cooperating with the reflected binary pattern on member 52 to a degree of resolution limited by the size of these elements. The intermediate position between bits of the highest order number read by brushes 54 on member 52 will determine the position of the code tracks 14 and 16 on transparent member 56. For example, the reflected binary pattern on member 52 may provide readout to a resolution of $(2)^{10}$ or 1024 bits, if the casing 34 is only approximately six inches in diameter. This provides a resolution by conventional readout of approximately 21 minutes of arc per bit and with such an arrangement, the $(2)^{10}$ track bit may be .030 inch wide. The optical tracks 14 and 16 effectively provide the next higher order; i.e., $(2)^{11}$ bit equivalents, and precisely at the beginning of each $(2)^{11}$ bit angular increment, the optical tracks are arranged to provide a stable null position with balanced and low light intensity of transmitted beams "$a$" and "$b$," FIG. 2.

The illumination is provided by a miniature lamp 58 which may be five to ten watts and operated at low voltage to obtain long operating life. The light from lamp 58 is transmitted through a light pipe 60 and a prism 62 to a condensing lens 64. The light is then projected through a mask 66 through to illuminate a portion of optical tracks 14 and 16 on transparent disc 56. This corresponds to the portion L of disc 10 in FIG. 1. The light transmitted by mask 66 passes through the transparent area 18 of member 56, thus projecting the dark image of opaque areas 17.

Figure 4:
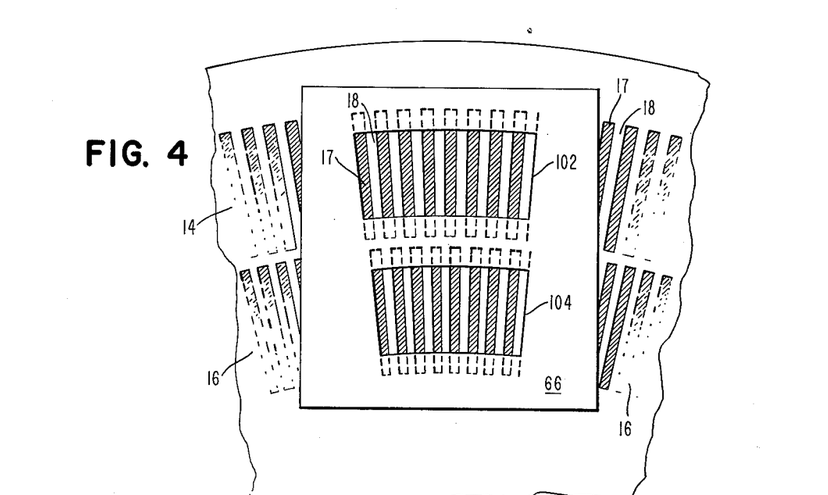
FIG. 4 is an enlarged detailed view showing optical tracks on the input disc and a mask covering portions thereof.

The mask 66 and tracks 14 and 16 are shown in enlarged detail in FIG. 4. The mask 66 contains openings 102 and 104 overlying each track. Each opening is a precise size to include an integral number of transparent and opaque areas 18 and 17 in each track. The radial height of the openings 102 and 104 is less than the height of the opaque areas in tracks 14 and 16 to minimize area changes from eccentricity. It is noted that the arc length of the mask openings 102 and 104 is an integral number of two bit intervals. This construction of the mask 66 restricts the illumination to a predetermined number of bits of each optical track to average any pattern errors of the tracks and to increase the intensity of the transmitted beams.

Referring again to FIG. 3, a right angle prism assembly 68 reflects the projected image and bends it around corners to direct the image into a high contrast high resolution projecting lens assembly 70. The lens assembly may consist of separated lens units with 0.7 inch diameter aperture (F/2.8). An optical micrometer including two counter rotating members 72 and 74 each having a plurality of optical refracting wedge sections thereon are adapted to suitably deviate the projected image in a manner to be explained in detail hereinafter. The deviated projected image then passes through another lens system 76 similar to lens system 70 and then to another prism assembly 78 similar to prism assembly 68. The two prism assemblies 68 and 78 are used to erect the image without reverting it, so that a rotation of the glass scale will cause the track pattern and superimposed image to move in opposite angular directions. Other known optical projection systems using mirrors or lenses may be used for image erection. The symmetrical optical system aids in eliminating optical aberrations.

The deviated image is then projected through tracks 14 and 16 on the opposite side of the transparent disc 56, corresponding to position M, FIG. 1, and into light transmission pipes 80 and 83 to keep separate the light transmitted by tracks 14 and 16. The light pipes 80 and 83 diffuse the transmitted light and spread the light intensity over the entire area of photocells 20 and 22 located at an out-of-focus position. These photocells and light pipes are supported on a member 84 attached to base 34. The photocells are connected to two legs of the bridge 24 and output of bridge circuit 24 is fed to a suitable saturating transistor amplifier 26 which limits the rate of rotation of servo motor 28 during the rapid rotation of the input and rapid bit-to-bit transitions of the optical tracks 14 and 16.

The servo motor 28 is directly connected to a pinion 88 which is in mesh with a large gear 90 attached to vernier readout disc 30. The vernier disc 30 has a slightly non-linear reflected binary code pattern thereon and this disc may be read out to a degree of resolution limited by the diameter thereof, the readout being accomplished by conventional brushes 95. The large gear 90 drives an idler shaft 92 through a spur gear 94 attached to the idler shaft. The gear ratio may be a set up ratio of 4. On the other end of the idler shaft, there is attached a precision gear 96 which is in mesh with a large gear 98 on a shaft 99 of the rotating optical micrometer member 72. The ratio between the gear 96 and gear 98 may be 16 to 1, thus providing a drive from gear 90 to optical micrometer member 72 of precisely 4 to 1. In other words, during one revolution, the optical micrometer members 72 and 74, the gear 90 and vernier disc 30 will rotate four times, as each micrometer member has four wedges thereon and the image will be deviated from one null position to another during each 90° of rotation, as will be explained in detail hereinafter. An identical rotating micrometer member 74 is driven in an identical manner from large gear 90 and, although they are shown in FIG. 3 as positioned one above the other for the sake of clarity, in actual construction it is contemplated that the axes of member 72 and 74 will be parallel to the optical axis, so that they would be directly in back and directly in front, respectively, of the optical axis of members 70 and 76; see FIG. 5 (bottom view). The gearing from the motor 28 to the optical micrometer rotating members 72 and 74 is precision gearing and is chosen especially to eliminate backlash and any errors which could be introduced into the system at this point. Furthermore, with the two gear trains for optical micrometer members 72 and 74 being in parallel from the input gear 90, any inherent errors which would occur in driving the two micrometer discs will be reduced since each member contributes only one-half of the total deviation of the image.

Figure 5:
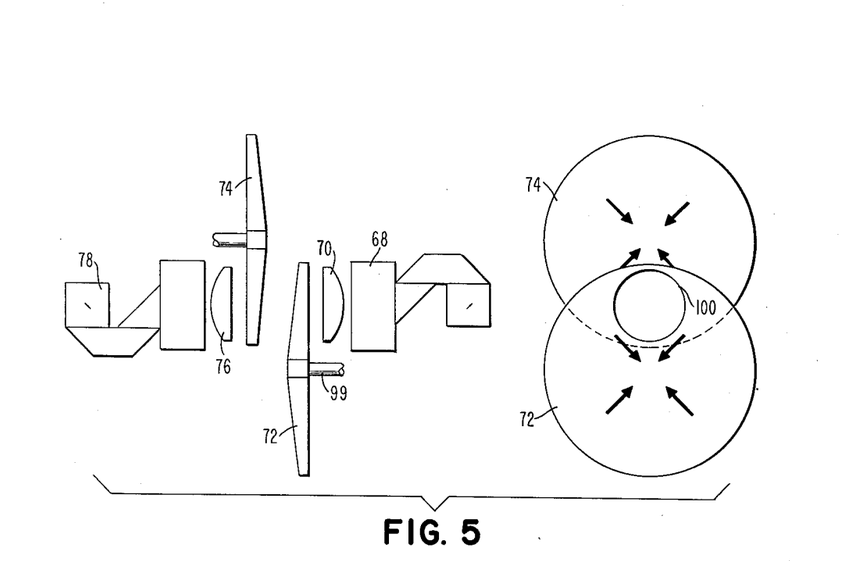
FIG. 5 is a schematic view showing plan and end elevation, respectively, from left to right of a rotating wedge sector optical micrometer which will produce a sawtooth deviation of an image during continuous rotation.

A schematic view of the micrometer disc 72 and 74, as they would appear in the actual system, is shown in FIG. 5, the lefthand portion of FIG. 5 being a schematic bottom plan view and the righthand portion of FIG. 5 being a side elevation view. Each of the micrometer discs 72 and 74 is constructed to contain four wedge sectors, each sector increasing in thickness toward the center of rotation in a direction of the arrows, as shown in FIG. 5. The aperture of the lens system is shown by the circle 100.

Figure 6:
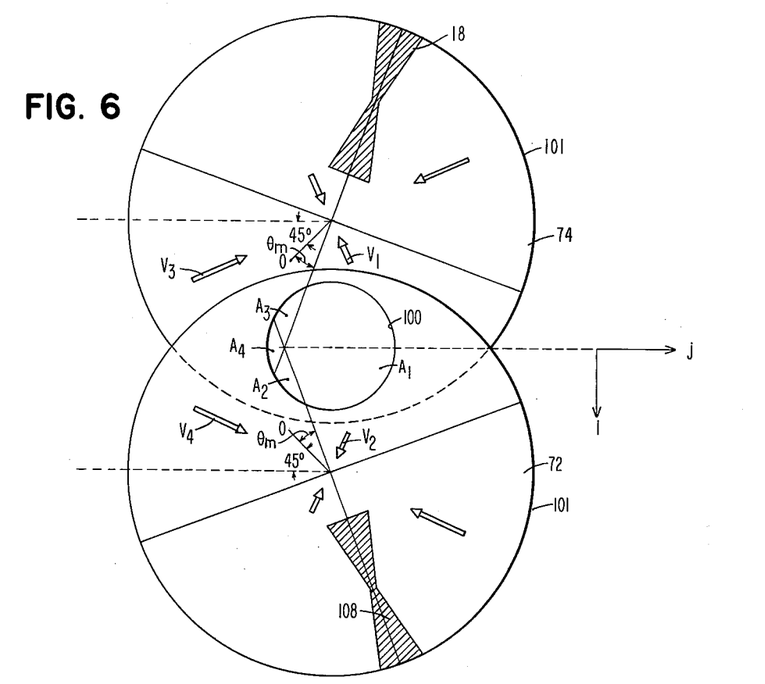
FIG. 6 is an enlarged end elevation of the rotating wedge sector optical micrometer.

The optical micrometer for deviation of the projected image of the opaque areas 17 of the optical tracks to create a null in the transmitted light beams should have unlimited and continuous rotation to provide automatic and reliable high speed operation. The optical micrometer consisting of counter rotating members 72 and 74 is one type of micrometer which will accomplish such results and produce approximate saw-tooth sweep or deviation of the image such as illustrated schematically in FIG. 7a. The construction of the micrometer consists of the two members 72 and 74 in disc form which are rotatably mounted and adapted to slightly overlap each other in the field viewed by the lens system as defined by circle 100, FIG. 6. Each disc is divided into four sectors, each containing an optical wedge 101 which is thicker toward the center of the disc than it is at the edge. The direction of increasing wedge thickness is shown schematically by the arrows on FIG. 6. Because light will be deviated in the direction of increasing thickness the arrows also illustrate the direction of deviation of the image contributed by each wedge sector. Referring to the area within circle 100, the wedge may be constructed such that each wedge sector will contribute a $$\frac{1}{\sqrt{2}}$$

or 0.707 bit deviation of the image in the direction represented by the vectors V1, V2, V3 and V4 in FIG. 6. Starting from a zero position of the boundary between adjacent wedges, which zero position is indicated in FIG. 6 by reference line 0, where V1 and V2 only contribute image deviation and they cancel one another, the angular movement of the micrometers in a counter rotating manner is indicated as $\theta_M$. The deviation in the direction "$j$" is the angular offset of the image or useful component of deviation while deviation of the image in the direction "$i$" is radially along the optical tracks and is not a useful deviation.

The table below indicates the image deviation for various micrometer positions as contributed by each of the effective aperture areas $A_1$, $A_2$, $A_3$ and $A_4$ as indicated on FIG. 6. The deviation is indicated in bits.

| Micrometer Position $\theta_M$ | Effective Aperture Area | Bit Deviation: $j$=angular offset (useful component), $i$=radial offset |
|---|---|---|
| 0°±65° | $A_1$ | $d_1 = \vec{V1} + \vec{V2} = -(j)\sqrt{2}[\sin\theta_M]$ |
| 45°±20° | $A_2$ | $d_2 = \vec{V1} + \vec{V4} = (i-j)\frac{1}{\sqrt{2}}[\sin\theta_M - \cos\theta_M]$ |
| 45°±20° | $A_3$ | $d_3 = \vec{V2} + \vec{V3} = (i-j)\frac{1}{\sqrt{2}}[\sin\theta_M - \cos\theta_M]$ |
| 90°±65° | $A_4$ | $d_4 = \vec{V3} + \vec{V4} = +(j)\sqrt{2}[\cos\theta_M]$ |

Figure 7:
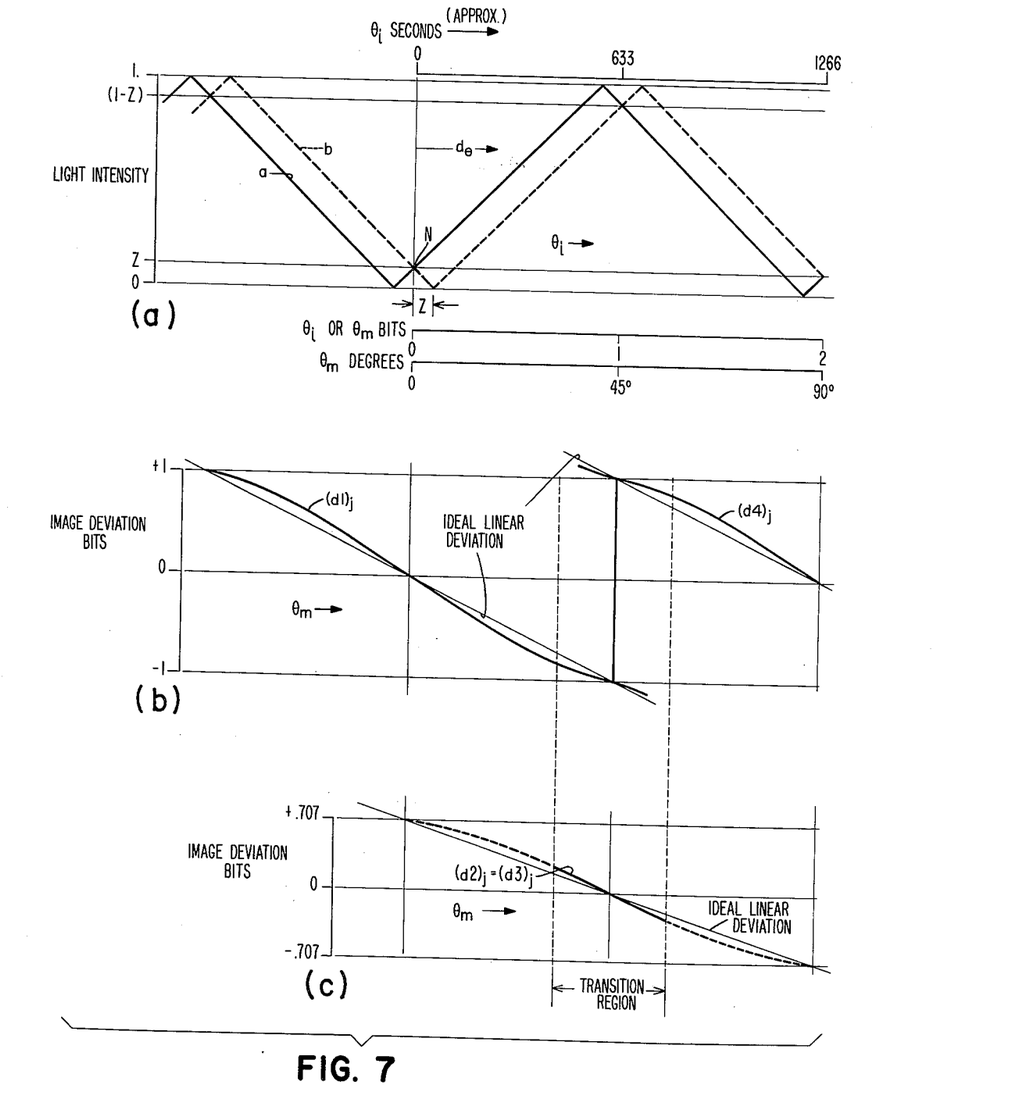
FIG. 7 is a graphical illustration of the deviating power of the rotating wedge type optical micrometer.

Referring to FIG. 7, 7a shows the input angle $\theta_i$ in seconds and bits and the micrometer position $\theta_M$ in degrees and bits and the corresponding relative intensity of the light transmitted by beams "$a$" and "$b$." The angular offset of the tracks 14 and 16 is shown as Z in FIG. 7a. This angular offset must be adequate; i.e., equal to .15 bit; to insure that all image angular deviation components at the composite null position N as represented by equal total light intensities on both photocells 20 and 22 will be within plus or minus Z from an intersection point of the two optical tracks.

FIG. 7b and 7c are graphs showing the actual image deviations ($d_1$, $d_2$, $d_3$ and $d_4$) obtained with the counter rotating wedge sector type of optical micrometer in bits as a function of the angular rotation of the micrometer for each of the lens aperture areas $A_1$, $A_2$, $A_3$ and $A_4$. The deviation ($d_1 j$) caused by $A_1$ in the effective or "$j$" direction is shown in the lefthand portion of FIG. 7b and as this effective deviation nears minus one bit, the approximately plus one bit effective deviation ($d_4 j$) of $A_4$ is superimposed upon it. During this transition region, the areas $A_2$ and $A_3$ create additional deviations of the image as shown in FIG. 7c. The ideal image deviations are also shown (as straight lines) in FIGS. 7b and 7c; this actual deviation from the ideal linear deviation is compensated by a non-linear code on vernier disc 30.

As an example, with the input angle $\theta_i$ equal to 0.6 bit, which is in the transition region of the optical micrometer, $\theta_M$ equals 270 or (0.6×45°). For this example, the following table shows the deviated image positions and the small image deviation error.

| Aperture Areas | Bits Image Position for $\theta$=0.6 Bit $\theta_M$=270 | | Bits Image Position Error |
|---|---|---|---|
| $A_1$ | $[d_{1j}+\theta_i]$ | | |
| | $-\sqrt{2}(\sin 27°)+0.600 = -.042$ | | $-.042$ |
| $A_2, A_3$ | $[d_{2j}+\theta_i]=[d_{3j}+\theta_i]$ | | |
| | $\frac{1}{\sqrt{2}}(\sin 27°-\cos 27°)*+0.600 = .909$ | | $-.091$ |
| $A_4$ | $[d_{4j}+\theta_i]$ | | |
| | $\sqrt{2}\cos 27°+0.600 = 1.860$ | | $-.140$ |

As shown in the preceding table and in FIG. 7, the deviated image positions from areas $A_1$ and $A_4$ fall near the optical track intersection points of zero bits and two bits respectively, but the deviated images from areas $A_2$ and $A_3$; i.e., $d_2$ and $d_3$ fall near the one bit position where the light intensity is high.

The discs 72 and 74 of the micrometer have radially extending hourglass shaped opaque areas or strips 108 at the adjacent boundaries of the wedges to reduce the areas $A_2$ and $A_3$. This tends to keep nearly constant the total light intensity at null transmitted to each photocell for all angular positions of the micrometer discs.

The position of the input disc ($\theta_i$) for a composite null may be determined for given micrometer positions ($\theta_M$) by calculation from equations expressing the relative light intensity transmitted by tracks "$a$" and "$b$."

It has been demonstrated that the micrometer discs 72 and 74 can be continuously rotated to accomplish suitable deviation of the projected image for nulling the servo system. The rotation of the micrometer discs may be continuous and unimpeded, and it is noted that the discs rotate once to create four saw-tooth deviations of the image for each four revolutions of the vernier disc 30.

It would be possible to substitute a stationary optical wedge for one of the rotating micrometer discs; however, this would possibly degrade the micrometer performance.

Figure 8:
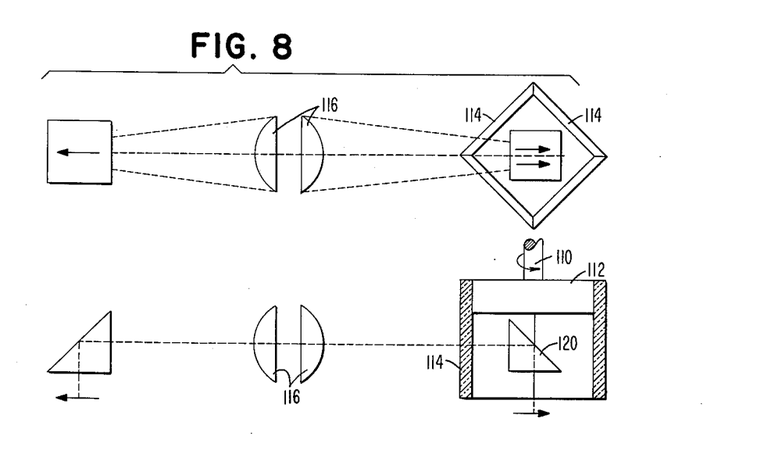
FIG. 8 is a top view and side elevation view, from left to right, respectively, of a modification of the optical micrometer.

Another type of optical micrometer which will permit continuous rotation is shown in FIG. 8. This micrometer, with continuous rotation, will produce an approximate saw-tooth deviation of the image similar to that described above. The micrometer is mounted on a rotatable shaft 110 containing a base member 112 and four parallel plane optical refracting members 114. These parallel plane refracting members are secured together at their edges in the form of a square. Projection lens 116 may be included in a system and with such a system an image may be suitably deviated in a sawtooth sweep during rotation of support shaft 110. The deviated image may then be erected by a suitable prism 120. For accurate and fine resolution, the rotating wedge-type optical micrometer is preferred, since the rotating parallel plane type optical micrometer plate 114 may be thin and somewhat difficult to fabricate. If a slower speed disc servo rotation can be tolerated, other types of known optical micrometers could be utilized, for example, cam operated plane refracting plates used in theodolites.

A brief summary of the operation of the device will now be described. A member such as a gyroscope, telescope, or the like, attached to table 46 may cause movement of table 46 relative to base 34. This movement in the form of an angular input causes table 46 to rotate. A rough digital representation of the angular position of table 46 is obtained by brushes 54 reading out the code on member 52 to determine the angular position of the table 46 to a resolution limited by the size of member 52. The highest order conventional readout track on member 52 is effectively supplemented to the next higher order by the optical tracks defined by opaque and transparent areas 17 and 18 in two separate tracks 14 and 16 around the periphery of transparent disc 56. Movement of the input member 10 of FIG. 1, i.e., table 46 of FIG. 3, between bit boundaries of the highest order provided by readout brushes 54 will cause movement of the optical tracks from a null position. At null position, the intensity of the transmitted light on photocells 20 and 22 through tracks 14 and 16 is equal and it is relatively low. By moving the optical tracks, one beam's intensity will increase while the other decreases, unbalancing bridge 24 and causing servo motor 28 to drive the optical micrometer and vernier 30. The optical micrometer will deviate the projected image and rebalance the system at a null where transmitted beams "a" and "b" have equal and low intensity. This null position may be read by conventional readout brushes 92 on disc 30. During relative fast rotation of the input member 46, the motor 28 will follow the deviation up to a predetermined speed as determined by limiting amplifier 26. The speed of the input member 46 is therefore not limited to the multiplied speed required for the vernier follow-up, and the fine positioning of the device is limited only by the speed of the servo motor 28. It would also be possible to disconnect the servo motor 28 and use the sharply defined nulls to produce pulses and obtain readout only at this time.

A small glass input circular scale (4.9 inches in diameter), directly driven by the input, without speed-up gears, carries a balanced pair of $(2)^{11}$ bit optical code tracks. By using two tracks, each having a small angular offset, the direction of rotation from the null is indicated by the direction of unbalance of a bridge circuit, and the bit-to-bit transitions are indicated as sharply defined nulls. Input circular scale eccentricity errors are cancelled by the inherent averaging of diametrically opposite readings. A fine resolution optical micrometer, utilizing two counter rotating wedge discs, is used to subdivide the $(2)^{11}$ bits of the input circular scale into increments of 1¼ seconds of arc. Each optical micrometer disc consists of four wedge sectors that generate a saw-tooth optical sweep. Since this construction permits continuous rotation of the micrometer, it is capable of high speed operation. These counter rotating micrometer discs are precision geared (1:4) to a servo driven vernier disc, thus providing an expanded scale. It rotates 360° for each two bits angular change of the input glass scale (representing 1/1024 revolution or approximately 1266 seconds of arc). Since the vernier disc speed is limited by a saturating servo amplifier, extremely high input slew speeds may be accommodated. Conventional brush readout is provided, with $(2)^{10}$ bits for the input disc and with another $(2)^{10}$ bits for the expanded vernier scale. This allows digitizing the input angular position to $(2)^{20}$ bits or 1¼ seconds of arc per bit.

Although the invention has been described for a preferred embodiment, the practice of this invention may take many forms, for example, the input disc may be a drum to accomplish substantially the same results with straight through illumination. Also, it is contemplated that the principle of this invention could be used in a linear digitizer with a linearly movable member having optical tracks thereon and another linear member with similar optical tracks to produce the sharply defined nulls at bit boundaries.

While there have been shown and described and pointed out the fundamental novel features of the invention as applied to the preferred embodiment, as well as the described alternate embodiments, it will be understood that other omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. An angle digitizer comprising; a directly driven input member mounted for displacement, said member containing a digital scale means thereon, readout means providing a digital readout of the displaced position of said input member to a predetermined order, optical means on said input member to provide a digital representation of a numerical order higher than that provided by said input member readout means, photosensitive means to sense the position of said input disc between bits in the higher order thereof, a servo motor operatively connected to be driven in accordance with the optical reception by said photosensitive means, an optical micrometer driven by said servo and adapted to deviate the optical reception received by said photosensitive means to null said servo motor, a vernier member driven by said servo motor and having an expanded digital scale thereon, said vernier thereby being positioned in accordance with the position of the servo motor and hence the position of the input member between bits provided by said optical means of the highest numerical order thereon, and readout means for reading the digital scale of said vernier.

2. An angle digitizer as defined in claim 1 wherein said optical micrometer comprises a pair of rotatably mounted support members, the axis of rotation of each of said members being parallel to the optical axis, a plurality of wedge sector optical refracting members mounted on each support member to provide a refracting disc of different sectors, the refracting wedge sectors adapted to deviate an image, the support members being positioned such that the wedge sectors carried thereby will overlap the optical axis, thereby providing for deviation of a projected image, the deviation in one direction increasing and decreasing in a substantially saw-tooth manner during the rotation of said support members.

3. An apparatus for providing a digital reading of angular shaft position, said apparatus comprising; an input member, means providing a rough digital output from said input shaft representing a rough angular position of said member, a vernier disc providing a fine representation of the position of said input shaft between positions provided by said rough representation, means for reading out the position of said vernier disc, means providing illumination which varies with the position of said input member, a servo adapted to position said vernier disc, means for driving said servo in accordance with the transmitted illumination greater than a predetermined amount, an optical refracting means driven by said servo and adapted to refract the transmitted illumination to provide predetermined intensity of transmitted illumination for nulling the servo.

4. An apparatus as defined in claim 3 wherein said optical refracting means comprises at least one rotatably mounted support, optical refracting members carried by said support, said optical refracting members adapted to provide in approximate saw-tooth deviation of the transmitted illumination during rotation of said support.

5. An angle digitizer comprising; a directly driven input disc mounted for angular displacement, said disc having a digital scale thereon, readout means providing a digital representation of an angular position of said input disc, a pair of optical tracks on said input disc to effectively provide a digital representation of a next higher order from the digital representation provided by said input disc readout means, optical means for projecting a portion of each optical track on to the diametrically opposite portion thereof to obtain an average reading of the angular position of the input disc by means of the optical tracks, photosensitive means for each track to sense any unbalance of the optical intensity therefrom, a servo motor operatively connected to be selectively driven in either direction in accordance with any detected optical unbalance, an optical micrometer driven by said servo and adapted to deviate the projected image of the optical tracks from one side of the disc between bit positions of said optical tracks to provide an optical null and rebalance the optical intensity detected by said photosensitive means, a vernier disc driven by said servo motor and having an expanded digital scale thereon, said vernier disc being positioned in accordance with the null position of said servo and hence the position of said input disc between bits of said optical tracks, and readout means for reading the digital scale of said vernier.

6. A shaft angle digitizer as defined in claim 5 wherein said optical micrometer is rotatably mounted, said micrometer including optical refracting means to produce an approximate saw-tooth deviation of an image projected therethrough during the continuous rotation thereof.

7. A shaft angle digitizer as defined in claim 6 wherein said optical refracting means includes two similar and over-lapping refracting discs mounted on counter rotating shafts, said shafts having an axis parallel to the optical axis, each disc having a plurality of optical wedge sectors, each of said wedge sectors adapted to deviate the rays therethrough, the simultaneous counter rotation of said wedge discs producing said approximate saw-tooth deviation of an image projected therethrough.

8. A shaft digitizer as defined in claim 6 wherein said optical refracting means includes four parallel plane refracting members mounted end-to-end to form a parallelogram, a rotary shaft adapted to drive said connected members, the axis of the shaft being transverse to the optical axis.

9. An apparatus for providing a digital representation of angular shaft position, said apparatus comprising; a direct driven member, means for directly reading the angular position of the input member as a rough digital representation of angular input position, said input member having evenly spaced transparent and opaque areas thereon, a predetermined distance from the axis of rotation thereof, means for directing a source of illumination through the transparent areas of the rotary member to provide an optical illumination output representative of a fine position of the input shaft between the positions of the highest order rough digital representations, illumination sensitive means responsive to said optical illumination output, through said transparent and opaque areas on said rotatable member, a vernier disc and means for directly reading said disc to provide a fine digital representation of said shaft position between the readings of the highest order rough digital representation, a positioning means for positioning said vernier disc, said positioning means being responsive to said illumination sensitive means for positioning said disc as a representation of the fine vernier position in response to the light transmitted to the illumination sensitive means.

10. An angle digitizer comprising; a directly driven input member mounted for displacement, said input member containing a digital scale thereon, readout means providing a digital readout of a displaced position of said input member to a predetermined numerical order, means on said input disc to provide a digital representation of the numerical order next higher than that provided by said input member readout means, a motor, means operatively connected to said motor to drive said motor in response to the position of said input member between bits of the highest order represented thereon as determined by sensing transmitted illumination which varies with intermediate bit position, optical means nulling said motor at the bit boundaries of the highest numerical order on said input member, a vernier member driven by said motor and having an expanded digital scale thereon, said vernier thereby being positioned in accordance with the position of said motor and hence the position of the input member between bits of the highest order on said input member, and readout means for reading the expanded digital scale on said vernier.

11. An input angle digitizer comprising; an input disc mounted for angular displacement and adapted to be directly driven, said disc having a digital scale thereon, readout means providing a digital representation of an angular position of said input disc, a pair of optical tracks on said input disc to provide a digital representation of a next higher order from the digital representation provided by said input disc readout means, said optical tracks being slightly radially offset from each other, optical means for projecting an erected image of a portion of each optical track on to the diametrically opposite portion thereof to cancel eccentricity errors and to obtain an average of the optical intensity of the transmitted beam through each of the optical tracks, photosensitive means for each track and corresponding transmitted beam to sense any unbalance of the optical intensity therefrom, a servo motor operatively connected to be driven in accordance with any detected optical unbalance, the relatively intensities of the transmitted beams determining the direction of rotation of said servo motor, an optical micrometer driven by said servo and positioned in the path of said optical projection from one side of said input disc to the other, said micrometer adapted to deviate the projected image of the optical tracks from one side of the disc to provide an optical null at the boundary of the digits of the order represented by said optical tracks and rebalance the optical intensity detected by said photosensitive means, a vernier disc driven by said servo motor and having an expanded digital scale thereon, said vernier disc being positioned in accordance with the null position of said servo at balanced minimum intensity of the transmitted beams and hence the position of said input disc between bits of the highest order digital representation thereon, and readout means for reading the digital scale of said vernier.

12. An input angle digitizer comprising; a directly driven input member mounted for angular displacement, said member containing a digital scale thereon, readout means for reading said digital scale and providing a digital readout of the angular position of said input member to a predetermined order, an optical scale on said input member adapted to provide a digital representation of the next numerical order higher than that provided by said input member readout means, means for illuminating said optical scale, photosensitive means to sense the position of said input disc between digits of the optical scale, a servo motor operatively connected to said photosensitive means to be driven in accordance with the position of said optical scale between digits, an optical refracting means driven by said servo and adapted to deviate the optical reception received by said photosensitive means to null said servo motor, a vernier driven by said servo motor, said vernier having an expanded digital scale thereon, the vernier thereby being positioned in accordance with the position of the optical refracting means at servo motor null and hence the position of the input member between digits provided on said optical scale, and readout means for reading the digital scale of said vernier.

13. An angle digitizer comprising; an input member adapted to be directly driven, a digital scale on said input member and means for reading out said scale to provide a digital representation of the angular position of the input member to a predetermined order, an optical scale on said input member, said optical scale including a pair of circular optical tracks of alternate opaque and transparent areas, the alternate opaque and transparent areas of each track being angularly offset, the optical scale effectively providing the next higher numerical order than that provided by the digital scale on the input member, means for projecting illumination from a source on to a restricted small area of said optical tracks, a symmetrical optical system for projecting the image of the opaque areas of each optical track on to the diametrically opposite portion of the same track, photosensitive means positioned adjacent each track to sense the intensity of the illumination transmitted through the transparent areas of each track, the angular offset of said tracks providing some illumination to the photosensitive means when the transmitted beams are low and of equal intensity, the input member being at a boundary position of an opaque and translucent area on said optical tracks when said transmitted beams are of equal intensity, a servo means operatively connected in an electric circuit to said photosensitive means and adapted to be rotated in either direction according to the unbalance of the transmitted beams and adapted to be nulled at a balanced beam transmission of low intensity, a vernier having an expanded digital scale thereon and mechanically connected to be driven by said servo; means to read out the expanded digital scale on said vernier, an optical refracting means rotatably mounted and driven from said servo, said optical refracting means adapted to refract the projected image of the optical tracks and deviate the projected image to balance the intensities of the transmitted beams at a low total intensity at an effective bit boundary position, the optical refracting means being constructed to provide image deviation which will increase and decrease in a substantially sawtooth curve as a function of the rotation of the refracting means.

14. An angle digitizer as defined in claim 13 wherein said means for projecting illumination from a source on to a restricted small area of the optical track includes a mask, said mask having a radial height less than the radial height of the opaque areas in each track and said mask having an angular length equal to an even integral number of opaque and translucent areas of the optical tracks.

15. An angle digitizer as defined in claim 14 wherein said expanded digital scale on said vernier is slightly non-linear to compensate for non-linear deviation of the projected image by said optical refracting means.

16. An angle digitizer as defined in claim 15 wherein said optical refracting means comprises a pair of rotatably mounted support members, the axis of rotation of each of said members being parallel to the optical axis, a plurality of wedge sector optical refracting members mounted on each support member to provide a refracting disc of different sectors, the refracting wedge sectors adapted to deviate an image, the support members being positioned such that the wedge sectors carried thereby will overlap the optical axis, thereby providing for deviation in one direction of a projected image, the deviation increasing and decreasing in a substantially saw-tooth manner during the rotation of said support members, and radially extending opaque areas at the boundaries of adjacent wedge sectors.

References Cited in the file of this patent

UNITED STATES PATENTS

| | | |
|---|---|---|
| 2,714,204 | Lippel et al. | July 26, 1955 |
| 2,754,502 | Dickinson | July 10, 1956 |
| 2,852,976 | Hoffman | Sept. 23, 1958 |
| 2,916,961 | Schwidefsky | Dec. 15, 1959 |
| 2,979,710 | Toth | Apr. 11, 1961 |